(12) United States Patent
Dimou

(10) Patent No.: US 12,713,269 B2
(45) Date of Patent: Aug. 18, 2026

(54) RECEIVE TIME DIFFERENCE INFORMATION REPORTING

(71) Applicant: QUALCOMM Incorporated, San Diego, CA (US)

(72) Inventor: Konstantinos Dimou, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 18/467,943

(22) Filed: Sep. 15, 2023

(65) Prior Publication Data

US 2024/0146471 A1 May 2, 2024

Related U.S. Application Data

(60) Provisional application No. 63/382,056, filed on Nov. 2, 2022.

(51) Int. Cl.
*H04W 24/10* (2009.01)
*H04L 5/00* (2006.01)

(52) U.S. Cl.
CPC ............. *H04W 24/10* (2013.01); *H04L 5/001* (2013.01)

(58) Field of Classification Search
CPC ............................... H04W 24/10; H04L 5/001
See application file for complete search history.

(56) References Cited

U.S. PATENT DOCUMENTS

2016/0021695 A1* 1/2016 Axmon ................. H04L 5/0035 370/329
2017/0212206 A1* 7/2017 Kim ...................... G01S 5/0205
2018/0011199 A1* 1/2018 Lombardi ............... G01S 19/14
2019/0049550 A1* 2/2019 Modarres Razavi . H04W 24/10
2021/0410094 A1* 12/2021 Cui ................... H04W 56/0055
2022/0039048 A1* 2/2022 Khoryaev ............. G01S 5/0273

* cited by examiner

*Primary Examiner* — Kevin C. Harper
(74) *Attorney, Agent, or Firm* — Harrity & Harrity LLP

(57) ABSTRACT

Various aspects of the present disclosure generally relate to wireless communication. In some aspects, a user equipment (UE) may receive, from a network node, at least one signal associated with a first component carrier. The UE may receive, from the network node, at least one signal associated with a second component carrier associated with an intra-band carrier aggregation (CA) of the first component carrier and the second component carrier. The UE may transmit receive time difference (RTD) information associated with one or more RTD measurements based on the at least one signal associated with the first component carrier and the at least one signal associated with the second component carrier. Numerous other aspects are provided.

30 Claims, 9 Drawing Sheets

RECEIVE TIME DIFFERENCE INFORMATION REPORTING

CROSS-REFERENCE TO RELATED APPLICATION

This Patent Application claims priority to U.S. Provisional Patent Application No. 63/382,056, filed on Nov. 2, 2022, entitled "RECEIVE TIME DIFFERENCE INFORMATION REPORTING," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for receive time difference reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some cases, a tracking reference signal can be used to facilitate UE synchronization with a secondary cell associated with a component carrier. In some cases, due to internal hardware associated with a network node, a UE can receive signals associated with different component carriers at different times in an intra-band carrier aggregation scenario in which the signals are transmitted using the same propagation channel. For example, the timing difference can result from drift between clocks associated with respective component carriers. Although the UE can be aware of the timing difference based on reception of the signals in an intra-band carrier aggregation operation associated with activation of the second cell, the timing difference is generally determined again during a subsequent activation of the second cell. In some cases, the difference in reception times can result in multiple tracking reference signal transmissions to facilitate UE timing synchronization associated with the secondary cell, thereby leading to delays and signaling overheads associated with cell access procedures.

SUMMARY

Some aspects described herein relate to a user equipment (UE) for wireless communication. The UE may include a processing system that includes processor circuitry and memory circuitry coupled with the processor circuitry. The processing system may be configured to cause the UE to receive, from a network node, at least one signal associated with a first component carrier. The processing system may be configured to cause the UE to receive, from the network node, at least one signal associated with a second component carrier associated with an intra-band carrier aggregation (CA) of the first component carrier and the second component carrier. The processing system may be configured to cause the UE to transmit receive time difference (RTD) information associated with one or more RTD measurements based on the at least one signal associated with the first component carrier and the at least one signal associated with the second component carrier.

Some aspects described herein relate to a network node for wireless communication. The network node may include a processing system that includes processor circuitry and memory circuitry coupled with the processor circuitry. The processing system may be configured to cause the network node to transmit at least one signal associated with a first component carrier. The processing system may be configured to cause the network node to transmit at least one signal associated with a second component carrier associated with an intra-band CA of the first component carrier and the second component carrier. The processing system may be configured to cause the network node to receive RTD information associated with one or more RTD measurements based on the at least one signal associated with the first component carrier and the at least one signal associated with the second component carrier.

Some aspects described herein relate to a method of wireless communication performed by an apparatus at a UE. The method may include receiving, from a network node, at least one signal associated with a first component carrier. The method may include receiving, from the network node, at least one signal associated with a second component carrier associated with an intra-band CA of the first component carrier and the second component carrier. The method may include transmitting RTD information associated with one or more RTD measurements based on the at least one signal associated with the first component carrier and the at least one signal associated with the second component carrier.

Some aspects described herein relate to a method of wireless communication performed by an apparatus at a network node. The method may include transmitting at least one signal associated with a first component carrier. The method may include transmitting at least one signal associated with a second component carrier associated with an intra-band CA of the first component carrier and the second component carrier. The method may include receiving RTD information associated with one or more RTD measurements based on the at least one signal associated with the first component carrier and the at least one signal associated with the second component carrier.

Some aspects described herein relate to a non-transitory computer-readable medium that stores a set of instructions for wireless communication by a UE. The set of instructions, when executed by one or more processors of the UE, may cause the UE to receive, from a network node, at least one signal associated with a first component carrier. The set of instructions, when executed by one or more processors of the UE, may cause the UE to receive, from the network node, at least one signal associated with a second component carrier associated with an intra-band CA of the first component carrier and the second component carrier. The set of instructions, when executed by one or more processors of the UE, may cause the UE to transmit RTD information associated with one or more RTD measurements based on the at least one signal associated with the first component carrier and the at least one signal associated with the second component carrier.

Some aspects described herein relate to a non-transitory computer-readable medium that stores a set of instructions for wireless communication by a network node. The set of instructions, when executed by one or more processors of the network node, may cause the network node to transmit at least one signal associated with a first component carrier. The set of instructions, when executed by one or more processors of the network node, may cause the network node to transmit at least one signal associated with a second component carrier associated with an intra-band CA of the first component carrier and the second component carrier. The set of instructions, when executed by one or more processors of the network node, may cause the network node to receive RTD information associated with one or more RTD measurements based on the at least one signal associated with the first component carrier and the at least one signal associated with the second component carrier.

Some aspects described herein relate to an apparatus for wireless communication. The apparatus may include means for receiving, from a network node, at least one signal associated with a first component carrier. The apparatus may include means for receiving, from the network node, at least one signal associated with a second component carrier associated with an intra-band CA of the first component carrier and the second component carrier. The apparatus may include means for transmitting RTD information associated with one or more RTD measurements based on the at least one signal associated with the first component carrier and the at least one signal associated with the second component carrier.

Some aspects described herein relate to an apparatus for wireless communication. The apparatus may include means for transmitting at least one signal associated with a first component carrier. The apparatus may include means for transmitting at least one signal associated with a second component carrier associated with an intra-band CA of the first component carrier and the second component carrier. The apparatus may include means for receiving RTD information associated with one or more RTD measurements based on the at least one signal associated with the first component carrier and the at least one signal associated with the second component carrier.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
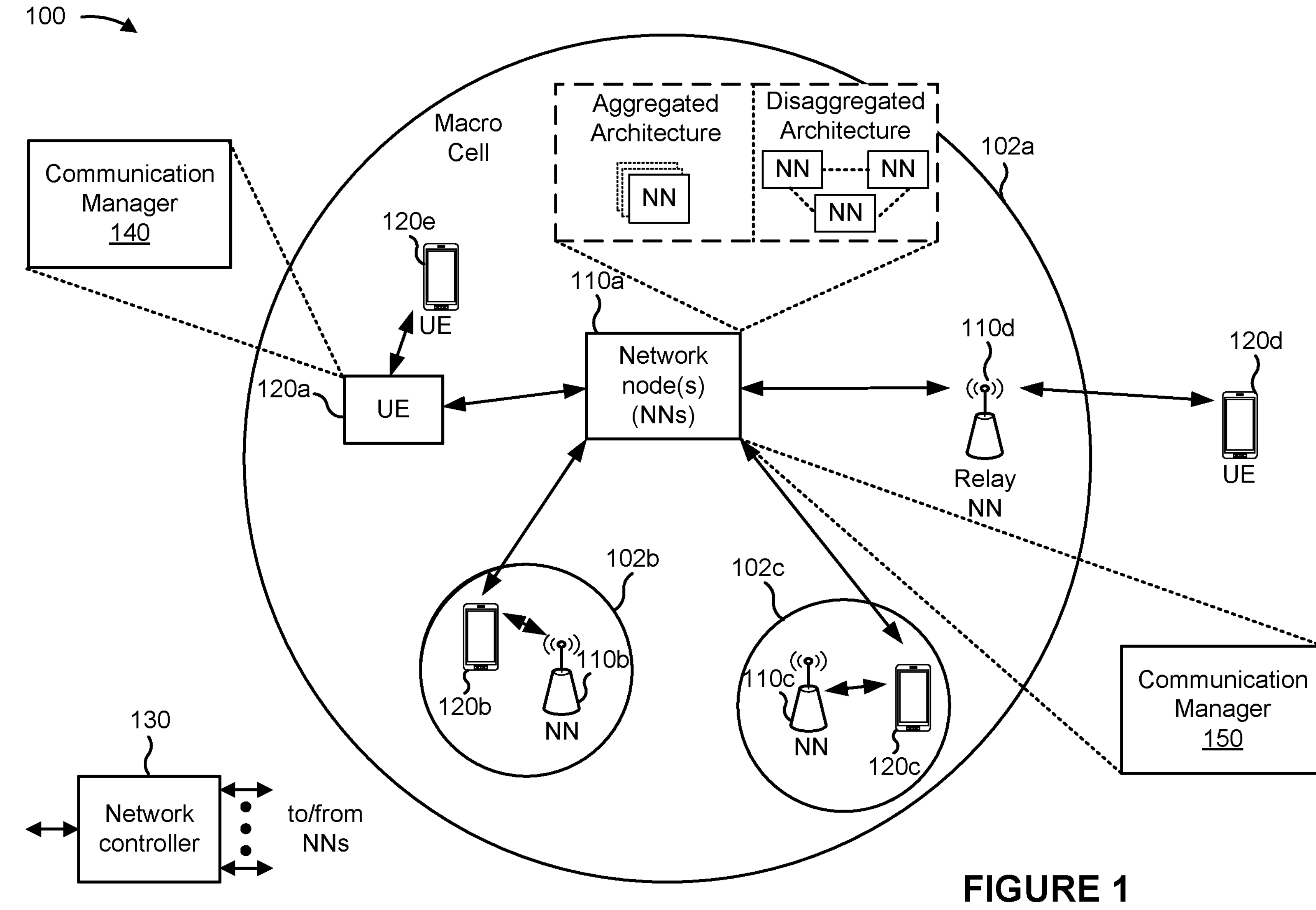
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to reporting receive time difference (RTD) information associated with multiple component carriers. Some aspects more specifically relate to storing and/or reporting information associated with an RTD associated with multiple component carriers. In some aspects, a user equipment (UE) may store RTD information associated with reception of signals associated with different component carriers. In some aspects, a UE may store RTD information associated with respective component carriers based on receiving signals associated with the component carriers in an intra-band carrier aggregation (CA) communication in which the component carriers are associated with a same propagation channel. In some aspects, the RTD information may be associated with RTD measurements associated with the signals. In some aspects, the RTD measurements may be indicative of a timing difference in reception of the signals based on internal hardware components of a network node. In some aspects, the timing difference in reception of the signals may be based on a drift of a clock associated with one component carrier in relation to a clock associated with another component carrier. In some aspects, the RTD information may include an RTD value and/or one or more RTD metrics (e.g., statistics and/or trend indications) associated with the RTD value and/or any number of additional RTD values obtained in association with additional signals received from a network node. In some aspects, the UE may report the RTD information and/or may use the stored RTD information to facilitate cell access procedures associated with the network node. In some aspects, the UE may use the RTD information associated with a first component carrier relative to a second component carrier to obtain synchronization with the second component carrier. For example, in an intra-band CA scenario, in which differences in receive times associated with the first and second component carriers are due only to the internal hardware of the network node, the UE may monitor a time window for a synchronization signal, where the time window is based on the RTD information. In another example, in an inter-band CA scenario, in which differences in receive times may be due to the internal hardware of the network node in addition to propagation channel differences, the UE may monitor, based on the RTD information, a narrower time window associated only with the propagation channel differences. In some aspects, the UE may store the RTD information for any future use in association with the component carriers. In some aspects, the UE may report the RTD information to the network node and the network node may use the RTD information to better align arrival times associated with the component carriers.

Particular aspects of the subject matter described in this disclosure can be implemented to realize one or more of the following potential advantages. In some examples, the described techniques can be used to provide network nodes with estimates of RTDs associated with different carriers for intra-band CA and/or inter-band CA. In some examples, reporting, to a network node, RTD information associated with intra-band CA RTD measurements of signals transmitted by the network node can be used to facilitate alignment of arrival times of future signals carried via the component carriers for intra-band CA and/or inter-band CA. In some examples, storing, by a UE, of RTD information associated with different component carriers can be used to facilitate more efficient secondary cell activation by reducing delays in acquiring synchronization in a secondary cell corresponding to one of the component carriers as a result of monitoring for the synchronization signals in time windows based on the RTD information. In some examples, the more efficient cell activation may be used to facilitate implementation of SSB-less cells and/or to reduce tracking reference signal overhead.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110)

may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

A network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple radio frequency (RF) chains, or multiple transceivers, each of which may in turn be coupled with one or more of multiple antennas. In some implementations, one or more processors of the processing system include or implement one or more of the radios, RF chains or transceivers. The network node 110 may include or may be included in a housing that houses components associated with the network node 110 including the processing system.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node **110*d* (for example, a relay network node) may communicate with the network node 110*a* (for example, a macro network node) and the UE 120*d* in order to facilitate communication between the network node 110*a* and the UE 120*d*. A network node 110** that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

A UE 120 may include one or more chips, SoCs, chipsets, packages, or devices that individually or collectively constitute or comprise a processing system. The processing system includes processor (or "processing") circuitry in the form of one or multiple processors, microprocessors, processing units (such as CPUs, GPUs, NPUs and/or DSPs), processing blocks, ASIC, PLDs (such as FPGAs), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as RAM or ROM, or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node, at least one signal associated with a first component carrier; receive, from the network node, at least one signal associated with a second component carrier associated with an intra-band CA of the first component carrier and the second component carrier; and transmit RTD information associated with one or more RTD measurements based on the at least one signal associated with the first component carrier and the at least one signal associated with the second component carrier. Additionally, or alternatively, the communication manager 140 may perform one or more other operations described herein.

In some aspects, the network node 110 may include a communication manager 150. As described in more detail elsewhere herein, the communication manager 150 may transmit at least one signal associated with a first component carrier; transmit at least one signal associated with a second component carrier associated with an intra-band CA of the first component carrier and the second component carrier; and receive RTD information associated with one or more RTD measurements based on the at least one signal associated with the first component carrier and the at least one signal associated with the second component carrier. Additionally, or alternatively, the communication manager 150 may perform one or more other operations described herein.

Figure 2:
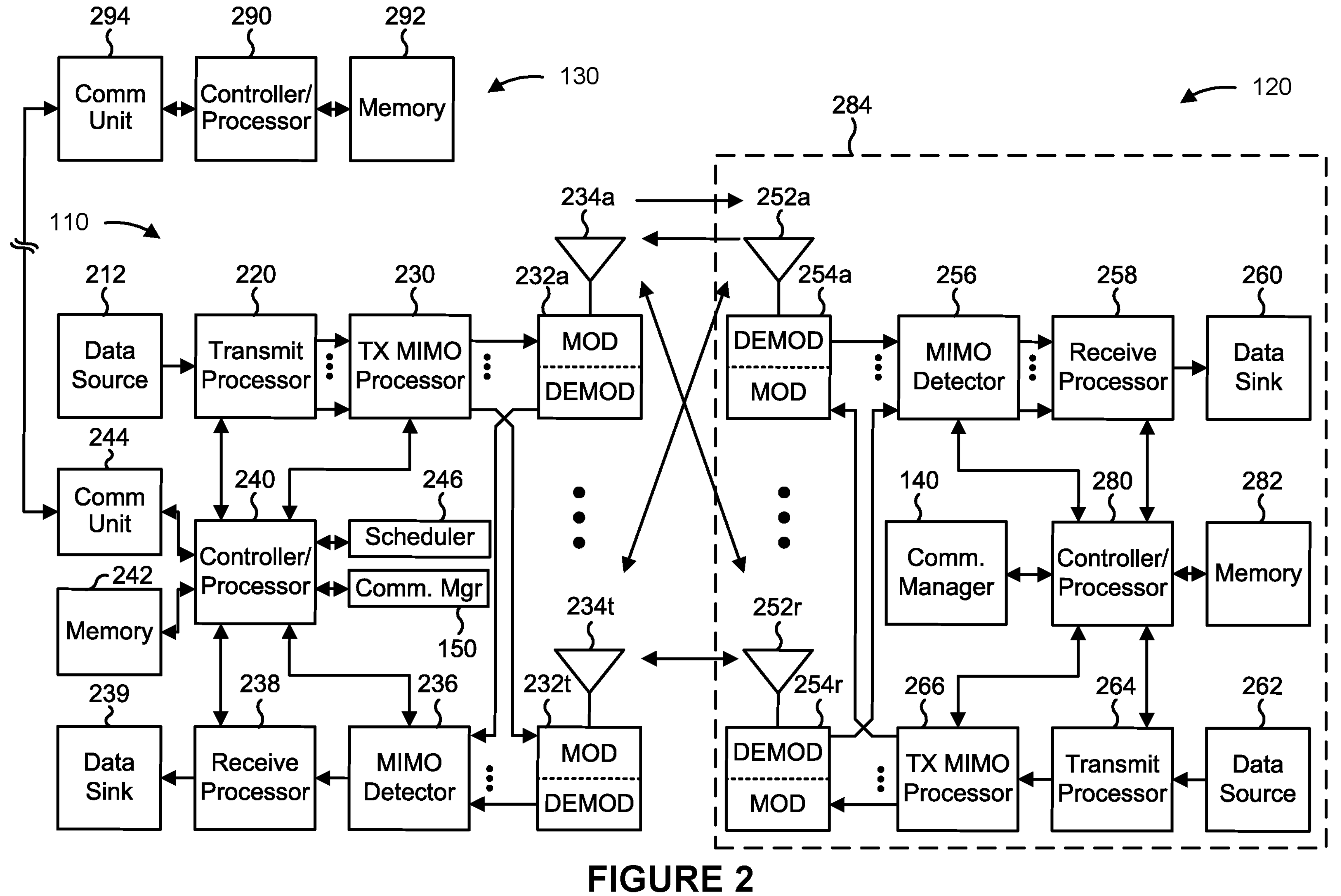
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with RTD reporting, as described in more detail elsewhere herein. For example, the controller/processor 240 of the network node 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 220, TX MIMO processor 230, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

In some aspects, a UE (e.g., the UE 120) includes means for receiving, from a network node, at least one signal associated with a first component carrier; means for receiving, from the network node, at least one signal associated with a second component carrier associated with an intra-band CA of the first component carrier and the second component carrier; and/or means for transmitting RTD information associated with one or more RTD measurements based on the at least one signal associated with the first component carrier and the at least one signal associated with the second component carrier. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting at least one signal associated with a first component carrier; means for transmitting at least one signal associated with a second component carrier associated with an intra-band CA of the first component carrier and the second component carrier; and/or means for receiving RTD information associated with one or more RTD measurements based on the at least one signal associated with the first component carrier and the at least one signal associated with the second component carrier. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
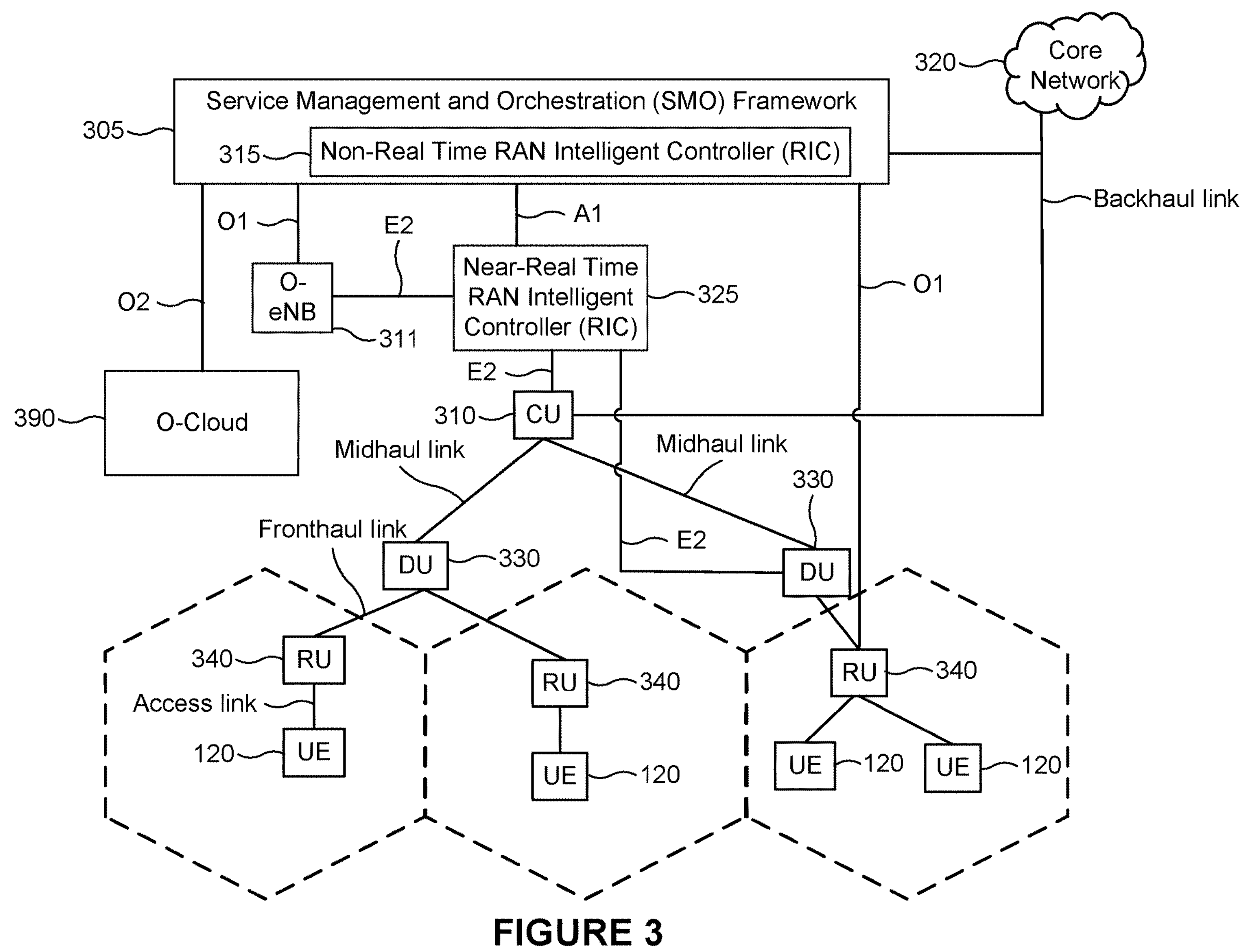
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
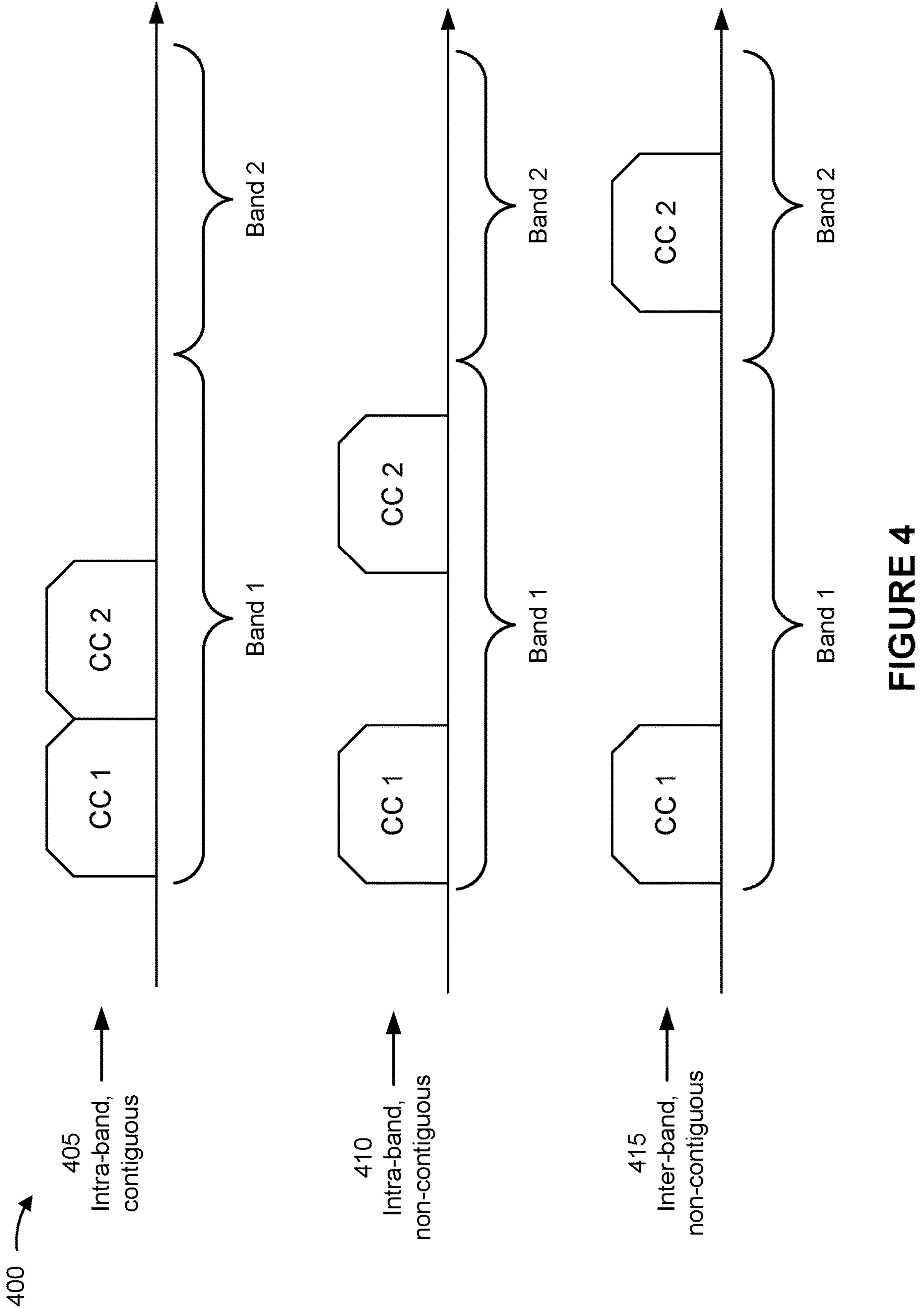
FIG. 4 is a diagram illustrating examples of carrier aggregation (CA) in accordance with the present disclosure.

FIG. 4 is a diagram illustrating examples 400 of CA in accordance with the present disclosure.

CA is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in an RRC message, downlink control information (DCI), and/or another signaling message.

In a first operation 405, in some aspects, CA may be configured in an intra-band contiguous mode where the aggregated carriers are contiguous to one another and are in the same band. In a second operation 410, in some aspects, carrier aggregation may be configured in an intra-band non-contiguous mode where the aggregated carriers are non-contiguous to one another and are in the same band. In a third operation 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some cases, due to internal hardware associated with a network node, a UE can receive a signal associated with a first component carrier at a different time than the UE receives a signal associated with a second component carrier. The difference in time between the two receptions can be referred to as receive time difference (RTD). The RTD in intra-band CA can be due to internal network node hardware. For example, in some cases, an RTD in intra-band CA can be due to clock drifting that can occur between clocks associated with the respective carriers. The RTD in inter-band CA can be due to the internal network node hardware in addition to propagation delay (e.g., differences in the propagation channels associated with the respective component carriers). RTD in both intra-band CA and inter-band CA can result in delays in the UE acquiring timing synchronization, and therefore cell access, in a secondary cell (e.g., a cell associated with the second component carrier) and/or unnecessary overhead due to tracking reference signal (TRS) bursts used to acquire the timing synchronization.

Various aspects relate generally to reporting RTD information associated with multiple component carriers. Some aspects more specifically relate to receiving a first signal associated with a first component carrier and a second signal associated with a second component carrier. In some aspects, a UE may store RTD information associated with reception of the two signals. In some aspects, the RTD information may include an RTD value and/or one or more RTD metrics (e.g., statistics and/or trend indications) associated with the RTD value and/or any number of additional RTD values obtained in association with additional signals received from a network node associated with the first component carrier and the second component carrier. In some aspects, the UE may report the RTD information and/or may use the stored RTD information to facilitate cell access procedures associated with the network node.

Particular aspects of the subject matter described in this disclosure can be implemented to realize one or more of the following potential advantages. In some examples, the described techniques can be used to provide network nodes with estimates of RTDs associated with different carriers in intra-band CA. In some examples, the described techniques can be used to facilitate alignment of arrival time of signals from different component carriers in intra-band CA and/or inter-band CA. In some examples, the described techniques can be used to facilitate more efficient secondary cell activation by reducing delays in acquiring synchronization in a secondary cell. In some examples, the more efficient cell activation may be used to facilitate implementation of SSB-less cells (e.g., cells that do not transmit cell defining SSBs) and/or to reduce tracking reference signal overhead.

Figure 5:
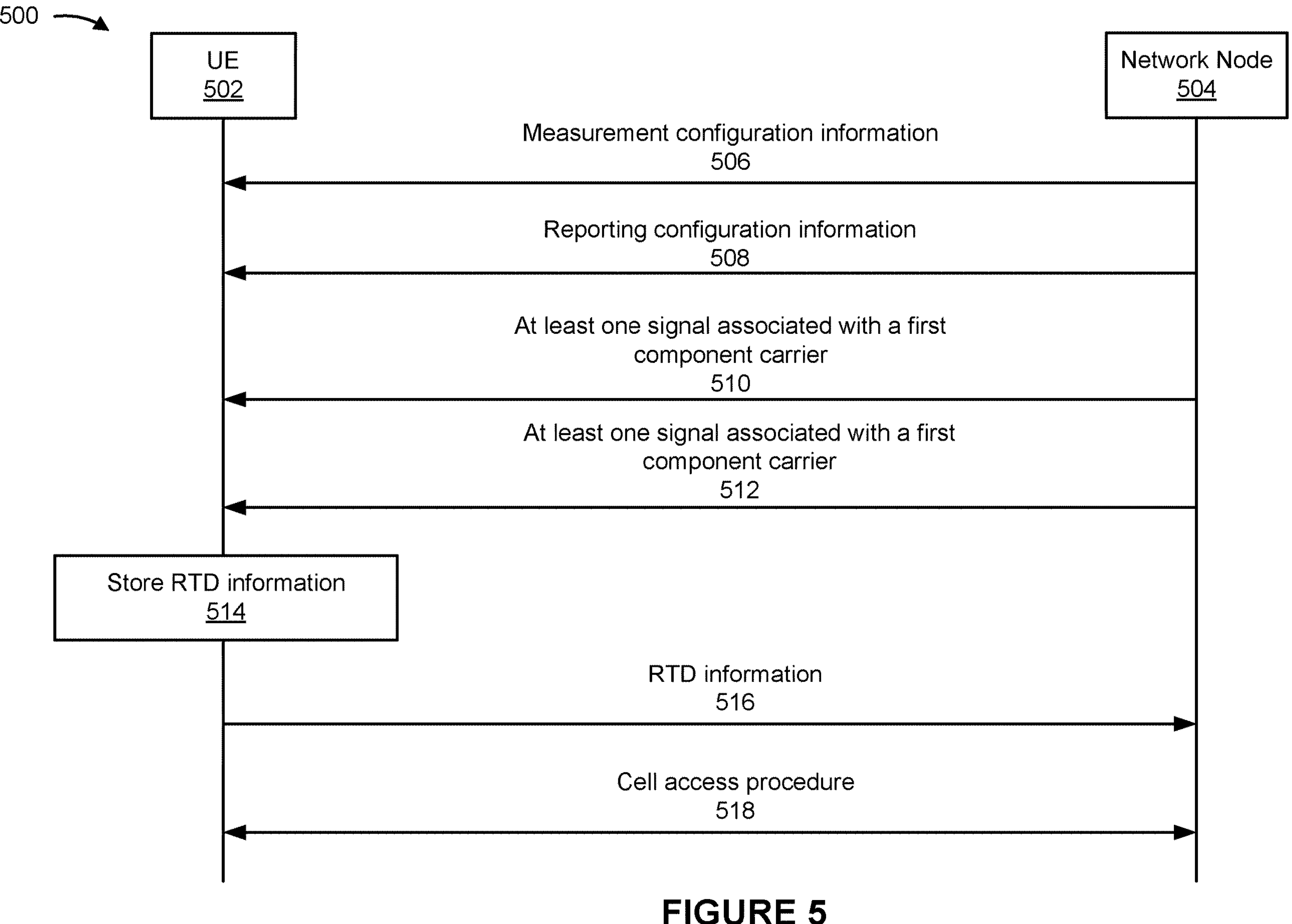
FIG. 5 is a flow diagram illustrating an example of receive time difference reporting in accordance with the present disclosure.

FIG. 5 is a flow diagram illustrating an example 500 of RTD reporting, in accordance with the present disclosure. As shown in FIG. 5, a UE 502 and a network node 504 may communicate with one another.

In a first operation 506, the network node 504 may transmit, and the UE 502 may receive, measurement configuration information. The measurement configuration information may be associated with one or more RTD measurements. In some aspects, the measurement configuration information may be transmitted using a configuration communication indicating the measurement configuration information. The configuration communication may include an RRC message, a medium access control control element (MAC CE), and/or DCI.

In a second operation 508, the network node 504 may transmit, and the UE 502 may receive, reporting configuration information. The reporting configuration information may be associated with reporting the RTD information. The reporting configuration information may be transmitted using a configuration communication indicating the reporting configuration information. The configuration communication may include an RRC message, a MAC CE, and/or DCI.

In a third operation 510, the network node 504 may transmit, and the UE 502 may receive, at least one signal associated with a first component carrier. In a fourth operation 512, the network node 504 may transmit, and the UE 502 may receive, at least one signal associated with a second component carrier associated with an intra-band CA of the first component carrier and the second component carrier. The UE 502 may obtain RTD information associated with one or more RTD measurements based on the at least one signal associated with the first component carrier and the at least one signal associated with the second component carrier.

The one or more RTD measurements may be based on a drift of a first clock associated with the first component carrier at the network node in relation to a second clock associated with the second component carrier at the network node. In some aspects, the RTD information may indicate at least one RTD metric associated with a sample window associated with the one or more RTD measurements. The sample window may include a time period within which the one or more RTD measurements are obtained.

In some aspects, the at least one RTD metric may indicate a maximum RTD value, a minimum RTD value, an average RTD value, a standard deviation value, and/or a time-based trend, among other examples. In some aspects, the at least one RTD metric may indicate a time-based trend based on indicating one or more time-based characteristics associated with the one or more RTD measurements. For example, the at least one RTD metric may indicate an evolution, over time, of RTD measurements by indicating a set of RTD values, each RTD value being associated with a different time of measurement. In some aspects, the at least one RTD metric may indicate an evolution, over time, of RTD measurements by indicating whether RTD measurements increased or decreased during the sample window and/or a rate of change of RTD measurements during the sample window, among other examples.

For example, in some aspects, the UE 502 may obtain a number of RTD measurements associated with a first component carrier and a second component carrier, respectively, during a sample window and may generate the RTD information based on the RTD measurements. The sample window may be any period of time during which carrier aggregated signals associated with the carriers may be received. In some aspects, a length of the sample window may be configured via the measurement configuration information and/or the reporting configuration information. In some aspects, a length of the sample window may be based on one or more channel and/or device characteristics. In a fifth operation 514, the UE 502 may store the RTD information in a memory of the UE 502.

In a sixth operation 516, the UE 502 may transmit, and the network node 504 may receive, the RTD information. In a seventh operation 518, the UE 502 may perform a cell access procedure associated with the network node 504. For example, In some aspects, the UE 502 may perform the cell access procedure based on the RTD information. In some aspects, the cell access procedure may be associated with inter-band CA at the network node and/or intra-band CA at the network node. In some aspects, the cell access procedure may be associated with a synchronization signal block (SSB)-less cell provided by the network node.

Figure 6:
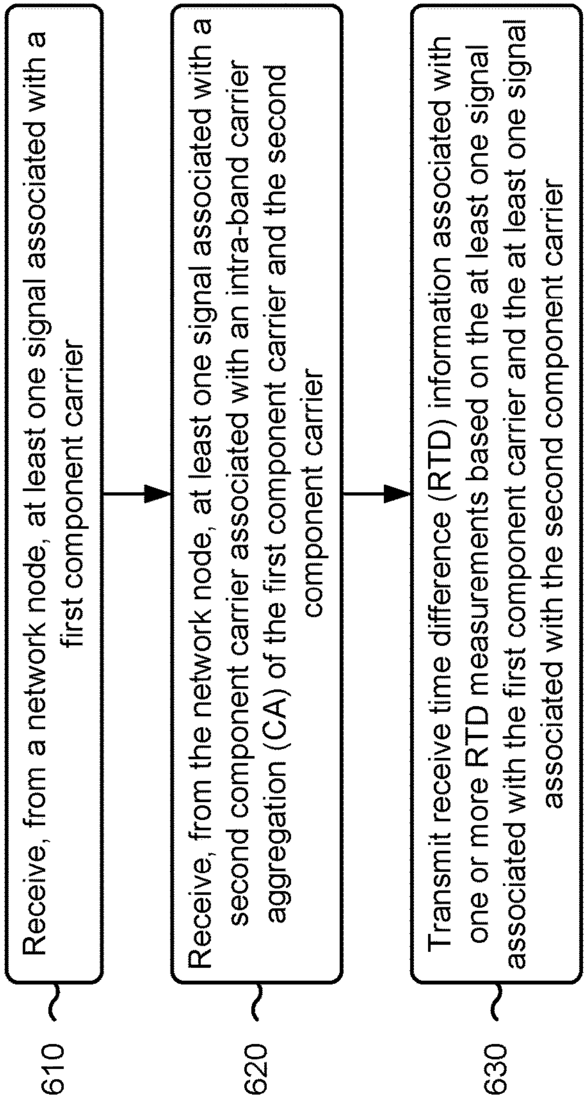
FIG. 6 is a flowchart illustrating an example process performed, for example, by a UE that supports receive time difference information reporting in accordance with the present disclosure.

FIG. 6 is a flowchart illustrating an example process 600 performed, for example, by a UE that supports CA in accordance with the present disclosure. Example process 600 is an example where the UE (for example, UE 502) performs operations associated with RTD reporting.

As shown in FIG. 6, in some aspects, process 600 may include receiving, from a network node, at least one signal associated with a first component carrier (block 610). For example, the UE (such as by using communication manager 808 or reception component 802, depicted in FIG. 8) may receive, from a network node, at least one signal associated with a first component carrier, as described above.

As further shown in FIG. 6, in some aspects, process 600 may include receiving, from the network node, at least one signal associated with a second component carrier associated with an intra-band CA of the first component carrier and the second component carrier (block 620). For example, the UE (such as by using communication manager 808 or reception component 802, depicted in FIG. 8) may receive, from the network node, at least one signal associated with a second component carrier associated with an intra-band CA of the first component carrier and the second component carrier, as described above.

As further shown in FIG. 6, in some aspects, process 600 may include transmitting RTD information associated with one or more RTD measurements based on the at least one signal associated with the first component carrier and the at least one signal associated with the second component carrier (block 630). For example, the UE (such as by using communication manager 808 or transmission component 804, depicted in FIG. 8) may transmit RTD information associated with one or more RTD measurements based on the at least one signal associated with the first component carrier and the at least one signal associated with the second component carrier, as described above.

Process 600 may include additional aspects, such as any single aspect or any combination of aspects described below or in connection with one or more other processes described elsewhere herein.

In a first additional aspect, the one or more RTD measurements are based on a drift of a first clock associated with the first component carrier at the network node in relation to a second clock associated with the second component carrier at the network node.

In a second additional aspect, alone or in combination with the first aspect, the RTD information indicates at least one RTD metric associated with a sample window associated with the one or more RTD measurements, the sample window comprising a time period within which the one or more RTD measurements are obtained, the at least one RTD metric indicating at least one of a maximum RTD value, a minimum RTD value, an average RTD value, a standard deviation value, or a time-based trend.

In a third additional aspect, alone or in combination with one or more of the first and second aspects, process 600 includes receiving measurement configuration information associated with the one or more RTD measurements.

In a fourth additional aspect, alone or in combination with one or more of the first through third aspects, receiving the measurement configuration information comprises receiving a configuration communication indicating the measurement configuration information, the configuration communication comprising at least one of an RRC message, a MAC CE, or DCI.

In a fifth additional aspect, alone or in combination with one or more of the first through fourth aspects, process 600 includes receiving reporting configuration information associated with reporting the RTD information, wherein transmitting the RTD information comprises transmitting the RTD information based on the reporting configuration information.

In a sixth additional aspect, alone or in combination with one or more of the first through fifth aspects, process 600 includes storing the RTD information in a memory of the UE, and performing, based on the RTD information, a cell access procedure associated with the network node.

In a seventh additional aspect, alone or in combination with one or more of the first through sixth aspects, the cell access procedure is associated with at least one of inter-band CA at the network node or intra-band CA at the network node.

In an eighth additional aspect, alone or in combination with one or more of the first through seventh aspects, the cell access procedure is associated with an SSB-less cell provided by the network node.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
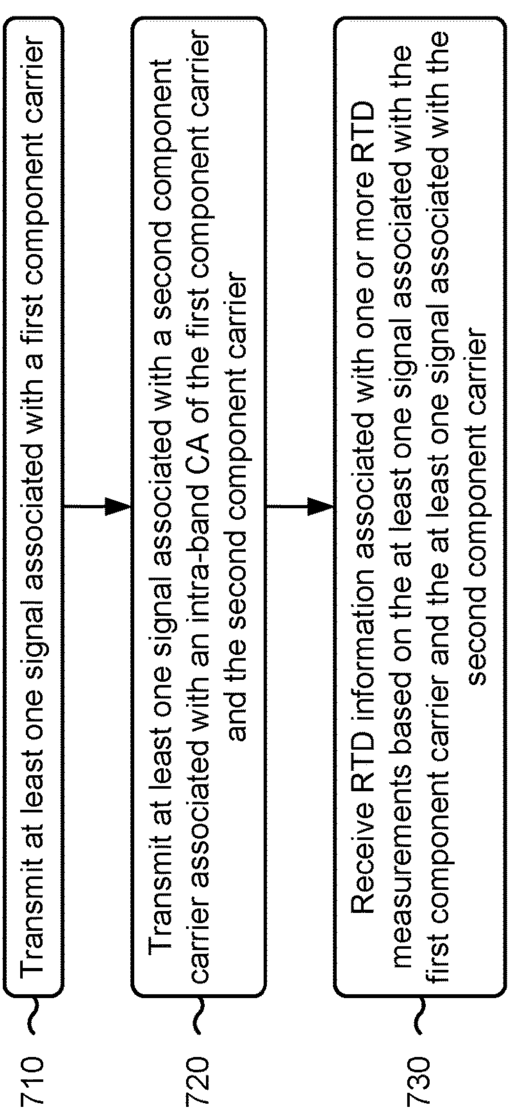
FIG. 7 is a flowchart illustrating an example process performed, for example, by a network node that supports receive time difference information reporting in accordance with the present disclosure.

FIG. 7 is a flowchart illustrating an example process 700 performed, for example, by a network node that supports CA in accordance with the present disclosure. Example process 700 is an example where the network node (for example, network node 504) performs operations associated with RTD reporting.

As shown in FIG. 7, in some aspects, process 700 may include transmitting at least one signal associated with a first component carrier (block 710). For example, the network node (such as by using communication manager 908 or transmission component 904, depicted in FIG. 9) may transmit at least one signal associated with a first component carrier, as described above.

As further shown in FIG. 7, in some aspects, process 700 may include transmitting at least one signal associated with a second component carrier associated with an intra-band CA of the first component carrier and the second component carrier (block 720). For example, the network node (such as by using communication manager 908 or transmission component 904, depicted in FIG. 9) may transmit at least one signal associated with a second component carrier associated with an intra-band CA of the first component carrier and the second component carrier, as described above.

As further shown in FIG. 7, in some aspects, process 700 may include receiving RTD information associated with one or more RTD measurements based on the at least one signal associated with the first component carrier and the at least one signal associated with the second component carrier (block 730). For example, the network node (such as by using communication manager 908 or reception component 902, depicted in FIG. 9) may receive RTD information associated with one or more RTD measurements based on the at least one signal associated with the first component carrier and the at least one signal associated with the second component carrier, as described above.

Process 700 may include additional aspects, such as any single aspect or any combination of aspects described below or in connection with one or more other processes described elsewhere herein.

In a first additional aspect, the one or more RTD measurements are based on a drift of a first clock associated with the first component carrier at the network node in relation to a second clock associated with the second component carrier at the network node.

In a second additional aspect, alone or in combination with the first aspect, the RTD information indicates at least one RTD metric associated with a sample window associated with the one or more RTD measurements, the sample window comprising a time period within which the one or more RTD measurements are obtained, the at least one RTD metric indicating at least one of a maximum RTD value, a minimum RTD value, an average RTD value, a standard deviation value, or a time-based trend.

In a third additional aspect, alone or in combination with one or more of the first and second aspects, process 700 includes transmitting measurement configuration information associated with the one or more RTD measurements.

In a fourth additional aspect, alone or in combination with one or more of the first through third aspects, transmitting the measurement configuration information comprises transmitting a configuration communication indicating the measurement configuration information, the configuration communication comprising at least one of an RRC message, a MAC CE, or DCI.

In a fifth additional aspect, alone or in combination with one or more of the first through fourth aspects, process 700 includes transmitting reporting configuration information associated with reporting the RTD information, wherein receiving the RTD information comprises receiving the RTD information based on the reporting configuration information.

In a sixth additional aspect, alone or in combination with one or more of the first through fifth aspects, process 700 includes performing, based on the RTD information, a cell access procedure associated with a UE.

In a seventh additional aspect, alone or in combination with one or more of the first through sixth aspects, the cell access procedure is associated with at least one of inter-band CA at the network node or intra-band CA at the network node.

In an eighth additional aspect, alone or in combination with one or more of the first through seventh aspects, the cell access procedure is associated with an SSB-less cell provided by the network node.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
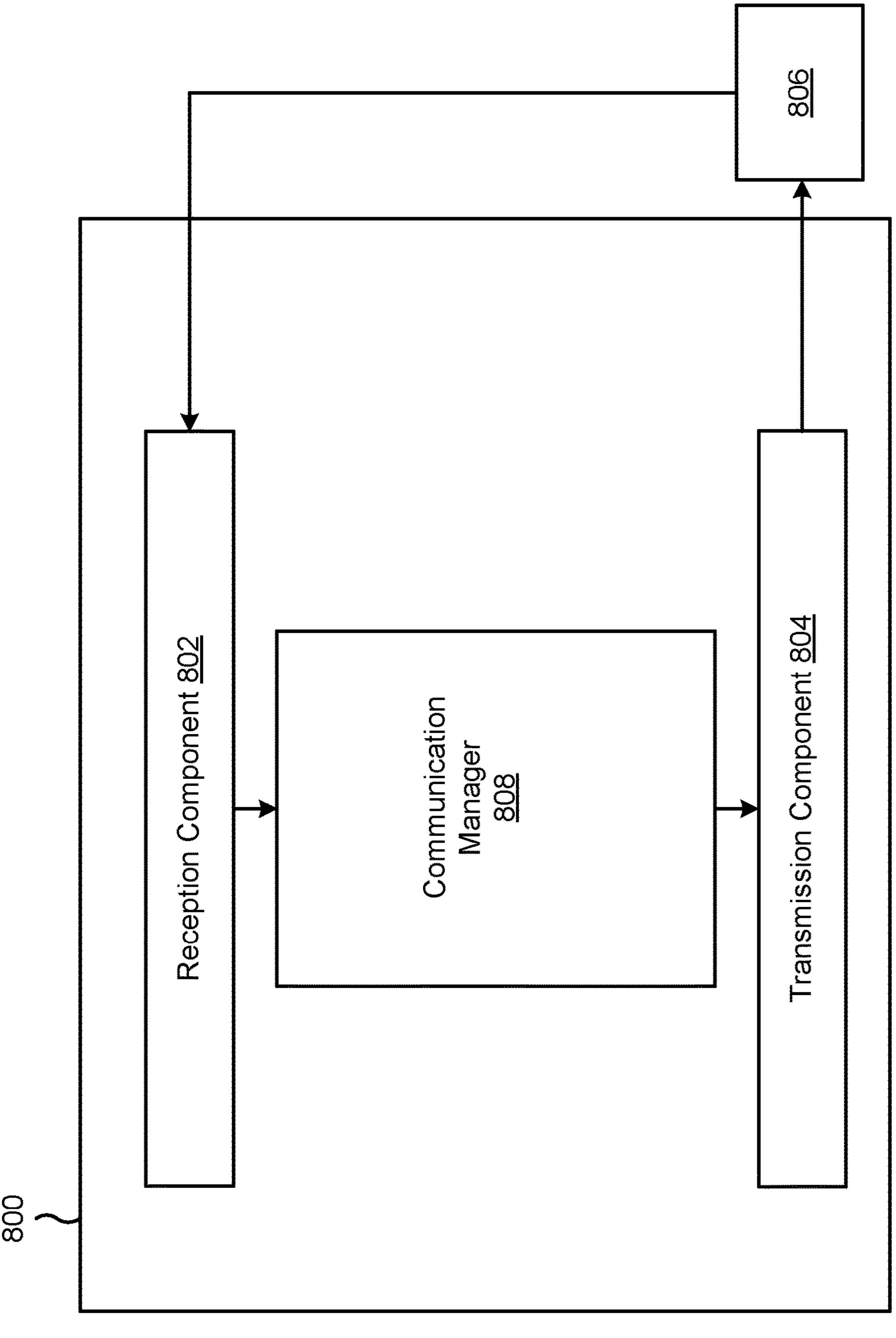
FIG. 8 is a diagram of an example apparatus for wireless communication that supports receive time difference information reporting in accordance with the present disclosure.

FIG. 8 is a diagram of an example apparatus 800 for wireless communication that supports CA in accordance with the present disclosure. The apparatus 800 may be a UE, or a UE may include the apparatus 800. In some aspects, the apparatus 800 includes a reception component 802, a transmission component 804, and a communication manager 808, which may be in communication with one another (for example, via one or more buses). As shown, the apparatus 800 may communicate with another apparatus 806 (such as a UE, a network node, or another wireless communication device) using the reception component 802 and the transmission component 804.

In some aspects, the apparatus 800 may be configured to perform one or more operations described herein in connection with FIG. 5. Additionally or alternatively, the apparatus 800 may be configured to perform one or more processes described herein, such as process 600 of FIG. 6. In some aspects, the apparatus 800 may include one or more components of the UE described above in connection with FIG. 2.

The reception component 802 may receive communications, such as reference signals, control information, and/or data communications, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, and/or a memory of the UE described above in connection with FIG. 2.

The transmission component 804 may transmit communications, such as reference signals, control information, and/or data communications, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/ processor, and/or a memory of the UE described above in connection with FIG. 2. In some aspects, the transmission component 804 may be co-located with the reception component 802 in a transceiver.

The communication manager 808 may receive or may cause the reception component 802 to receive, from a network node, at least one signal associated with a first component carrier. The communication manager 808 may receive or may cause the reception component 802 to receive, from the network node, at least one signal associated with a second component carrier associated with an intra-band CA of the first component carrier and the second component carrier. The communication manager 808 may transmit or may cause the transmission component 804 to transmit RTD information associated with one or more RTD measurements based on the at least one signal associated with the first component carrier and the at least one signal associated with the second component carrier. In some aspects, the communication manager 808 may perform one or more operations described elsewhere herein as being performed by one or more components of the communication manager 808.

The communication manager 808 may include a controller/processor, and/or a memory, of the UE described above in connection with FIG. 2. In some aspects, the communication manager 808 may be, be similar to, include, or be included in, the communication manager 140 described above in connection with FIG. 2. In some aspects, the communication manager 808 includes a set of components. Alternatively, the set of components may be separate and distinct from the communication manager 808. In some aspects, one or more components of the set of components may include or may be implemented within a controller/processor, and/or a memory, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive, from a network node, at least one signal associated with a first component carrier. The reception component 802 may receive, from the network node, at least one signal associated with a second component carrier associated with an intra-band CA of the first component carrier and the second component carrier. The transmission component 804 may transmit RTD information associated with one or more RTD measurements based on the at least one signal associated with the first component carrier and the at least one signal associated with the second component carrier.

The reception component 802 may receive measurement configuration information associated with the one or more RTD measurements. The reception component 802 may receive reporting configuration information associated with reporting the RTD information, wherein transmitting the RTD information comprises transmitting the RTD information based on the reporting configuration information. The communication manager 808, the reception component 802, and/or the transmission component 804 may store the RTD information in a memory of the UE.

The communication manager 808, the reception component 802, and/or the transmission component 804 may perform, based on the RTD information, a cell access procedure associated with the network node.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
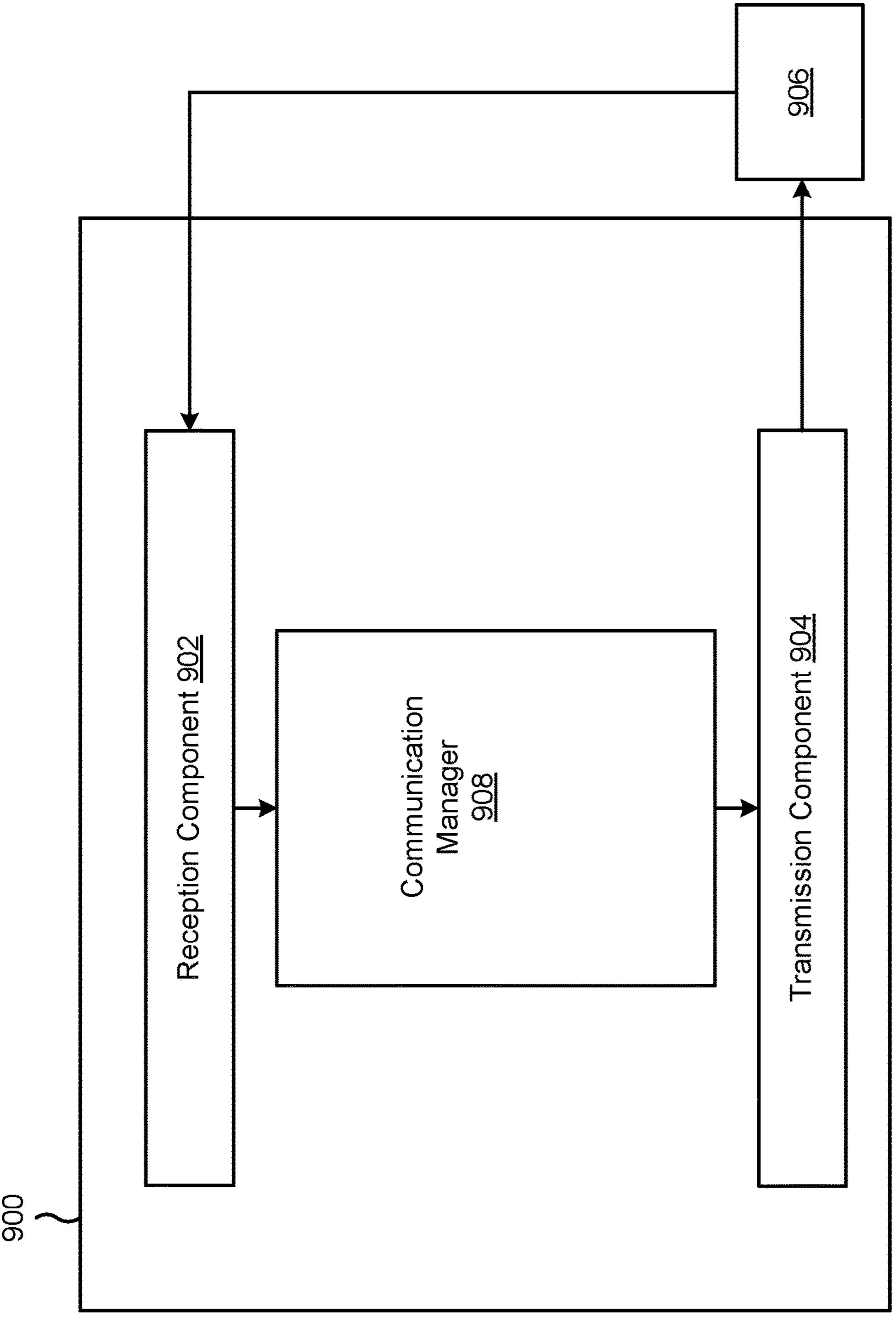
FIG. 9 is a diagram of an example apparatus for wireless communication that supports receive time difference information reporting in accordance with the present disclosure.

FIG. 9 is a diagram of an example apparatus 900 for wireless communication that supports CA in accordance with the present disclosure. The apparatus 900 may be a network node, or a network node may include the apparatus 900. In some aspects, the apparatus 900 includes a reception component 902, a transmission component 904, and a communication manager 908, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to perform one or more operations described herein in connection with FIG. 5. Additionally or alternatively, the apparatus 900 may be configured to perform one or more processes described herein, such as process 700 of FIG. 7. In some aspects, the apparatus 900 may include one or more components of the network node described above in connection with FIG. 2.

The reception component 902 may receive communications, such as reference signals, control information, and/or data communications, from the apparatus 906. The reception component 902 may provide received communications to one or more other components of the apparatus 900, such as the communication manager 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the network node described above in connection with FIG. 2.

The transmission component 904 may transmit communications, such as reference signals, control information, and/or data communications, to the apparatus 906. In some aspects, the communication manager 150 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the network node described above in connection with FIG. 2. In some aspects, the transmission component 904 may be co-located with the reception component 902 in a transceiver.

The communication manager 908 may transmit or may cause the transmission component 904 to transmit at least one signal associated with a first component carrier. The communication manager 908 may transmit or may cause the transmission component 904 to transmit at least one signal associated with a second component carrier associated with an intra-band CA of the first component carrier and the second component carrier. The communication manager 908 may receive or may cause the reception component 902 to receive RTD information associated with one or more RTD measurements based on the at least one signal associated with the first component carrier and the at least one signal associated with the second component carrier. In some aspects, the communication manager 908 may perform one or more operations described elsewhere herein as being performed by one or more components of the communication manager 908.

The communication manager 908 may include a controller/processor, a memory, a scheduler, and/or a communication unit of the network node described above in connection with FIG. 2. In some aspects, the communication manager 908 may be, be similar to, include, or be included in, the communication manager 150 described above in connection with FIG. 2. In some aspects, the communication manager 908 includes a set of components. Alternatively, the set of components may be separate and distinct from the communication manager 908. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 904 may transmit at least one signal associated with a first component carrier. The transmission component 904 may transmit at least one signal associated with a second component carrier associated with an intra-band CA of the first component carrier and the second component carrier. The reception component 902 may receive RTD information associated with one or more RTD measurements based on the at least one signal associated with the first component carrier and the at least one signal associated with the second component carrier.

The transmission component 904 may transmit measurement configuration information associated with the one or more RTD measurements. The transmission component 904 may transmit reporting configuration information associated with reporting the RTD information, wherein receiving the RTD information comprises receiving the RTD information based on the reporting configuration information. The communication manager 908, the reception component 902, and/or the transmission component 904, may perform, based on the RTD information, a cell access procedure associated with a UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by an apparatus at a user equipment (UE), comprising: receiving, from a network node, at least one signal associated with a first component carrier; receiving, from the network node, at least one signal associated with a second component carrier associated with an intra-band carrier aggregation (CA) of the first component carrier and the second component carrier; and transmitting receive time difference (RTD) information associated with one or more RTD measurements based on the at least one signal associated with the first component carrier and the at least one signal associated with the second component carrier.

Aspect 2: The method of Aspect 1, wherein the one or more RTD measurements are based on a drift of a first clock associated with the first component carrier at the network node in relation to a second clock associated with the second component carrier at the network node.

Aspect 3: The method of either of claim 1 or 2, wherein the RTD information indicates at least one RTD metric associated with a sample window associated with the one or more RTD measurements, the sample window comprising a time period within which the one or more RTD measurements are obtained, the at least one RTD metric indicating at least one of: a maximum RTD value, a minimum RTD value, an average RTD value, a standard deviation value, or a time-based trend.

Aspect 4: The method of any of Aspects 1-3, further comprising receiving measurement configuration information associated with the one or more RTD measurements.

Aspect 5: The method of Aspect 4, wherein receiving the measurement configuration information comprises receiving a configuration communication indicating the measurement configuration information, the configuration communication comprising at least one of: a radio resource control (RRC) message, a medium access control control element (MAC CE), or downlink control information (DCI).

Aspect 6: The method of any of Aspects 1-5, further comprising receiving reporting configuration information associated with reporting the RTD information, wherein transmitting the RTD information comprises transmitting the RTD information based on the reporting configuration information.

Aspect 7: The method of any of Aspects 1-6, further comprising: storing the RTD information in a memory of the UE; and performing, based on the RTD information, a cell access procedure associated with the network node.

Aspect 8: The method of Aspect 7, wherein the cell access procedure is associated with at least one of inter-band CA at the network node or intra-band CA at the network node.

Aspect 9: The method of either of claim 7 or 8, wherein the cell access procedure is associated with a synchronization signal block (SSB)-less cell provided by the network node.

Aspect 10: A method of wireless communication performed by an apparatus at a network node, comprising: transmitting at least one signal associated with a first component carrier; transmitting at least one signal associated with a second component carrier associated with an intra-band carrier aggregation (CA) of the first component carrier and the second component carrier; and receiving receive time difference (RTD) information associated with one or more RTD measurements based on the at least one signal associated with the first component carrier and the at least one signal associated with the second component carrier.

Aspect 11: The method of Aspect 10, wherein the one or more RTD measurements are based on a drift of a first clock associated with the first component carrier at the network node in relation to a second clock associated with the second component carrier at the network node.

Aspect 12: The method of either of claim 10 or 11, wherein the RTD information indicates at least one RTD metric associated with a sample window associated with the one or more RTD measurements, the sample window comprising a time period within which the one or more RTD measurements are obtained, the at least one RTD metric indicating at least one of: a maximum RTD value, a minimum RTD value, an average RTD value, a standard deviation value, or a time-based trend.

Aspect 13: The method of any of Aspects 10-12, further comprising transmitting measurement configuration information associated with the one or more RTD measurements.

Aspect 14: The method of Aspect 13, wherein transmitting the measurement configuration information comprises transmitting a configuration communication indicating the measurement configuration information, the configuration communication comprising at least one of: a radio resource control (RRC) message, a medium access control control element (MAC CE), or downlink control information (DCI).

Aspect 15: The method of any of Aspects 10-14, further comprising transmitting reporting configuration information associated with reporting the RTD information, wherein receiving the RTD information comprises receiving the RTD information based on the reporting configuration information.

Aspect 16: The method of any of Aspects 10-15, further comprising performing, based on the RTD information, a cell access procedure associated with a user equipment (UE).

Aspect 17: The method of Aspect 16, wherein the cell access procedure is associated with at least one of inter-band CA at the network node or intra-band CA at the network node.

Aspect 18: The method of either of claim 16 or 17, wherein the cell access procedure is associated with a synchronization signal block (SSB)-less cell provided by the network node.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors operable to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors operable to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

a processing system that includes processor circuitry and memory circuitry coupled with the processor circuitry, the processing system configured to cause the UE to:

receive, from a network node, at least one signal associated with a first component carrier;

receive, from the network node, at least one signal associated with a second component carrier associated with an intra-band carrier aggregation (CA) of the first component carrier and the second component carrier; and transmit information for a receive time difference (RTD) in the intra-band CA, wherein:

the information is associated with one or more RTD measurements based on the at least one signal associated with the first component carrier and the at least one signal associated with the second component carrier, and the RTD is based on a drift of a first clock associated with the first component carrier at the network node in relation to a second clock associated with the second component carrier at the network node.

2. The UE of claim 1, wherein the information for the RTD indicates at least one RTD metric associated with a sample window associated with the one or more RTD measurements, the sample window comprising a time period within which the one or more RTD measurements are obtained, the at least one RTD metric indicating at least one of:

a maximum RTD value, a minimum RTD value, an average RTD value, a standard deviation value, or a time-based trend.

3. The UE of claim 1, wherein the processing system is further configured to cause the UE to receive measurement configuration information associated with the one or more RTD measurements.

4. The UE of claim 3, wherein, to cause the UE to receive the measurement configuration information, the processing system is configured to cause the UE to receive a configuration communication indicating the measurement configuration information, the configuration communication comprising at least one of:

a radio resource control (RRC) message, a medium access control control element (MAC CE), or downlink control information (DCI).

5. The UE of claim 1, wherein the processing system is further configured to cause the UE to receive reporting configuration information associated with reporting the information for the RTD, and wherein, to cause the UE to transmit the information for the RTD, the processing system is configured to cause the UE to transmit the information for the RTD based on the reporting configuration information.

6. The UE of claim 1, wherein the processing system is further configured to cause the UE to:

store the information for the RTD in a memory of the UE; and perform, based on the information for the RTD, a cell access procedure associated with the network node.

7. The UE of claim 6, wherein the cell access procedure is associated with at least one of inter-band CA at the network node or intra-band CA at the network node.

8. The UE of claim 6, wherein the cell access procedure is associated with a synchronization signal block (SSB)-less cell provided by the network node.

9. A network node for wireless communication, comprising:

a processing system that includes processor circuitry and memory circuitry coupled with the processor circuitry, the processing system configured to cause the network node to:

transmit at least one signal associated with a first component carrier;

transmit at least one signal associated with a second component carrier associated with an intra-band carrier aggregation (CA) of the first component carrier and the second component carrier; and receive information for a receive time difference (RTD) in the intra-band CA, wherein:

the information is associated with one or more RTD measurements based on the at least one signal associated with the first component carrier and the at least one signal associated with the second component carrier, and the RTD is based on a drift of a first clock associated with the first component carrier at the network node in relation to a second clock associated with the second component carrier at the network node.

10. The network node of claim 9, wherein the information for the RTD indicates at least one RTD metric associated with a sample window associated with the one or more RTD measurements, the sample window comprising a time period within which the one or more RTD measurements are obtained, the at least one RTD metric indicating at least one of:

a maximum RTD value, a minimum RTD value, an average RTD value, a standard deviation value, or a time-based trend.

11. The network node of claim 9, wherein the processing system is further configured to cause the network node to transmit measurement configuration information associated with the one or more RTD measurements.

12. The network node of claim 11, wherein, to cause the network node to transmit the measurement configuration information, the processing system is configured to cause the network node to transmit a configuration communication indicating the measurement configuration information, the configuration communication comprising at least one of:

a radio resource control (RRC) message, a medium access control control element (MAC CE), or downlink control information (DCI).

13. The network node of claim 9, wherein the processing system is further configured to cause the network node to transmit reporting configuration information associated with reporting the information for the RTD.

14. The network node of claim 9, wherein the processing system is further configured to cause the network node to perform, based on the information for the RTD, a cell access procedure associated with a user equipment (UE).

15. The network node of claim 14, wherein the cell access procedure is associated with at least one of inter-band CA at the network node or intra-band CA at the network node.

16. The network node of claim 14, wherein the cell access procedure is associated with a synchronization signal block (SSB)-less cell provided by the network node.

17. A method of wireless communication performed by an apparatus at a user equipment (UE), comprising:

receiving, from a network node, at least one signal associated with a first component carrier;

receiving, from the network node, at least one signal associated with a second component carrier associated with an intra-band carrier aggregation (CA) of the first component carrier and the second component carrier; and transmitting information for a receive time difference (RTD) in the intra-band CA, wherein:

the information is associated with one or more RTD measurements based on the at least one signal associated with the first component carrier and the at least one signal associated with the second component carrier, and the RTD is based on a drift of a first clock associated with the first component carrier at the network node in relation to a second clock associated with the second component carrier at the network node.

18. The method of claim 17, wherein the information for the RTD indicates at least one RTD metric associated with a sample window associated with the one or more RTD measurements, the sample window comprising a time period within which the one or more RTD measurements are obtained, the at least one RTD metric indicating at least one of:

a maximum RTD value, a minimum RTD value, an average RTD value, a standard deviation value, or a time-based trend.

19. The method of claim 17, further comprising receiving measurement configuration information associated with the one or more RTD measurements.

20. The method of claim 19, wherein receiving the measurement configuration information comprises receiving a configuration communication indicating the measurement configuration information, the configuration communication comprising at least one of:

a radio resource control (RRC) message, a medium access control control element (MAC CE), or downlink control information (DCI).

21. The method of claim 17, further comprising receiving reporting configuration information associated with reporting the information for the RTD, wherein transmitting the information for the RTD comprises transmitting the information for the RTD based on the reporting configuration information.

22. The method of claim 17, further comprising:

storing the information for the RTD in a memory of the UE; and performing, based on the information for the RTD, a cell access procedure associated with the network node.

23. The method of claim 22, wherein the cell access procedure is associated with at least one of inter-band CA at the network node or intra-band CA at the network node.

24. The method of claim 22, wherein the cell access procedure is associated with a synchronization signal block (SSB)-less cell provided by the network node.

25. A method of wireless communication performed by an apparatus at a network node, comprising:

transmitting at least one signal associated with a first component carrier;

transmitting at least one signal associated with a second component carrier associated with an intra-band carrier aggregation (CA) of the first component carrier and the second component carrier; and receiving information for a receive time difference (RTD) in the intra-band CA, wherein:

the information is associated with one or more RTD measurements based on the at least one signal associated with the first component carrier and the at least one signal associated with the second component carrier, and the RTD is based on a drift of a first clock associated with the first component carrier at the network node in relation to a second clock associated with the second component carrier at the network node.

26. The method of claim 25, wherein the information for the RTD indicates at least one RTD metric associated with a sample window associated with the one or more RTD measurements, the sample window comprising a time period within which the one or more RTD measurements are obtained, the at least one RTD metric indicating at least one of:

a maximum RTD value, a minimum RTD value, an average RTD value, a standard deviation value, or a time-based trend.

27. The method of claim 25, further comprising transmitting measurement configuration information associated with the one or more RTD measurements.

28. The method of claim 27, wherein transmitting the measurement configuration information comprises transmitting a configuration communication indicating the measurement configuration information, the configuration communication comprising at least one of:

a radio resource control (RRC) message, a medium access control control element (MAC CE), or downlink control information (DCI).

29. The method of claim 25, further comprising transmitting reporting configuration information associated with reporting the information for the RTD.

30. The method of claim 25, further comprising performing, based on the information for the RTD, a cell access procedure associated with a user equipment (UE).

* * * * *